United States Patent
Toyoshima et al.

(10) Patent No.: US 12,398,305 B2
(45) Date of Patent: Aug. 26, 2025

(54) ADDITION-CURABLE SILICONE ADHESIVE COMPOSITION

(71) Applicant: SHIN-ETSU CHEMICAL CO., LTD., Tokyo (JP)

(72) Inventors: Takeharu Toyoshima, Annaka (JP); Toshiyuki Ozai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 965 days.

(21) Appl. No.: 17/600,669

(22) PCT Filed: Feb. 27, 2020

(86) PCT No.: PCT/JP2020/007915
§ 371 (c)(1),
(2) Date: Oct. 1, 2021

(87) PCT Pub. No.: WO2020/202932
PCT Pub. Date: Oct. 8, 2020

(65) Prior Publication Data
US 2022/0177756 A1   Jun. 9, 2022

(30) Foreign Application Priority Data
Apr. 2, 2019   (JP) .................. 2019-070646

(51) Int. Cl.
*C09J 183/06*   (2006.01)

(52) U.S. Cl.
CPC .................. *C09J 183/06* (2013.01)

(58) Field of Classification Search
CPC . C09J 183/06; C09J 183/04; C09J 7/00; C09J 9/00; C09J 11/06; C08G 77/12; C08G 77/14; C08G 77/20
See application file for complete search history.

(56) References Cited

U.S. PATENT DOCUMENTS

| | | | | |
|---|---|---|---|---|
| 5,744,507 A | * | 4/1998 | Angell | C08J 9/02 |
| | | | | 521/154 |
| 11,057,991 B2 | * | 7/2021 | Rogers | H05K 1/0283 |
| 2005/0032989 A1 | * | 2/2005 | Onai | C09J 183/04 |
| | | | | 525/477 |
| 2009/0274845 A1 | | 11/2009 | Aketa et al. | |
| 2010/0210794 A1 | | 8/2010 | Frese et al. | |
| 2012/0292558 A1 | * | 11/2012 | Kodama | H01L 23/296 |
| | | | | 252/78.3 |
| 2013/0023109 A1 | * | 1/2013 | Harkness | H01L 21/6835 |
| | | | | 257/E21.211 |
| 2013/0181361 A1 | | 7/2013 | Uehara et al. | |
| 2015/0299533 A1 | | 10/2015 | Koellnberger | |
| 2021/0198477 A1 | * | 7/2021 | Goto | B32B 27/08 |

FOREIGN PATENT DOCUMENTS

| | | |
|---|---|---|
| EP | 2 452 994 A1 | 5/2012 |
| JP | 8-311340 A | 11/1996 |
| JP | 2003-41231 A | 2/2003 |
| JP | 2008-169386 A | 7/2008 |
| JP | 2009-221312 A | 10/2009 |
| JP | 2009-292901 A | 12/2009 |
| JP | 2010-95699 A | 4/2010 |
| JP | 2010-539308 A | 12/2010 |

(Continued)

OTHER PUBLICATIONS

Onai, WO-2016092728-MT (Year: 2016).*

(Continued)

*Primary Examiner* — Robert S Jones, Jr.
*Assistant Examiner* — Zhen Liu
(74) *Attorney, Agent, or Firm* — Birch, Stewart, Kolasch & Birch, LLP

(57) ABSTRACT

This composition comprises:
(A) one or both of (i) and (ii), said (i) being polysiloxane (1) having a viscosity of 50-10,000,000 mPa·s, $$R^2R^1{}_2SiO(R^1{}_2SiO)_mSiR^1{}_2R^2 \quad (1),$$

and said (ii) being polysiloxane (2), $$(R^1{}_3SiO_{1/2})_p(R^2{}_aR^1{}_{3-a}SiO_{1/2})_q(SiO_{4/2})_r \quad (2);$$

(B) hydrogen polysiloxane (3), $$(H_bR^1{}_{3-b}SiO_{1/2})_s(R^1{}_3SiO_{1/2})_{2-s}(HR^1{}_1SiO_{2/2})_t (R^1{}_2SiO_{2/2})_u \quad (3);$$

(C) a hydrosilylation catalyst; and
(D) at least one among linear organosiloxane (4), $$(A_cR^3{}_{3-c}SiO_{1/2})_v(R^3{}_3SiO_{1/2})_{2-v}(AR^3{}_1SiO_{2/2})_w (R^3{}_2SiO_{2/2})_x \quad (4),$$

and cyclic organopolysiloxane (5), $$(AR^3{}_1SiO_{2/2})_y(R^3{}_2SiO_{2/2})_z \quad (5)$$

(A is an alicyclic epoxy group represented by formula (6)),

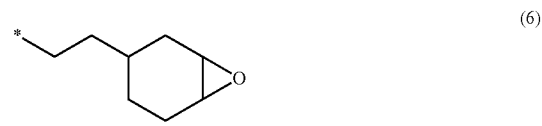

wherein the ratio of the total number of SiH's to the number of unsaturated bonds between (D) and the alkenyl of (A) is 0.8-1.5, said composition is rapidly cured at room temperature after mixing to exhibit adhesiveness to a substrate such as a metal or resin, and even after the cured product following adhesion is exposed to a high-temperature and high-humidity environment, the adhesiveness to the substrate does not deteriorate.

5 Claims, No Drawings

(56) References Cited

FOREIGN PATENT DOCUMENTS

| | | | |
|---|---|---|---|
| JP | 2012-117059 A | 6/2012 | |
| JP | 2013-18850 A | 1/2013 | |
| JP | 2013-60493 A | 4/2013 | |
| JP | 2013-144763 A | 7/2013 | |
| JP | 2015-225897 A | 12/2015 | |
| JP | 2016-505647 A | 2/2016 | |
| JP | 2016-108456 A | 6/2016 | |
| JP | 2018-76415 A | 5/2018 | |
| WO | WO-2016092728 A1 * | 6/2016 | ............ C08F 290/06 |

OTHER PUBLICATIONS

International Search Report for PCT/JP2020/007915 mailed on May 19, 2020.
Written Opinion of the International Searching Authority for PCT/JP2020/007915 mailed on May 19, 2020.

* cited by examiner

ADDITION-CURABLE SILICONE ADHESIVE COMPOSITION

TECHNICAL FIELD

This invention relates to an addition-curable silicone adhesive composition.

BACKGROUND ART

Silicone adhesives of addition cure type rely on the curing mechanism of hydrosilylation reaction with the aid of a platinum catalyst. Generally, liquid materials are cured and bonded to substrates in an environment at 100 to 150° C. Since the introduction and operation of a heater invite cost increases, and setting of heating and cooling times aggravates productivity, and in view of environmental considerations, normal temperature curable silicone adhesives of two part type are proposed (see Patent Documents 1 to 7).

The two part type materials take the form that various components including a base, platinum catalyst and crosslinker are separately packaged as first and second parts. Advantageously the material can be rapidly cured and bonded to substrates even at normal temperature by mixing the first and second parts.

In an endurance environment, especially hot humid environment, however, the bonded products formed at normal temperature experience a drop of adhesion, raising the problem that the adhesive spalls off from the substrate.

PRIOR ART DOCUMENTS

Patent Documents

Patent Document 1: JP-A 2008-169386
Patent Document 2: JP-A 2009-221312
Patent Document 3: JP-A 2009-292901
Patent Document 4: JP-A 2010-539308
Patent Document 5: JP-A 2012-117059
Patent Document 6: JP-A 2013-018850
Patent Document 7: JP-A 2013-060493

SUMMARY OF INVENTION

Technical Problem

An object of the invention, which has been made under the above-mentioned circumstances, is to provide an addition-curable silicone adhesive composition which rapidly cures at normal temperature after mixing and exhibits adhesion to substrates such as metal and resin substrates, the cured product after bonding being able to avoid a drop of adhesion to substrates after exposure to a hot humid environment.

Solution to Problem

Making extensive investigations to attain the above object, the inventors have found that by adding a siloxane compound having an alicyclic epoxy group as a tackifier to an addition-curable silicone adhesive composition, the drop of adhesion which is incurred in a hot humid environment is suppressed. The invention is predicated on this finding.

The invention is defined as follows.

1. An addition-curable silicone adhesive composition comprising:
   (A) at least one of (i) a linear organopolysiloxane with a viscosity of 50 to 10,000,000 mPa·s at 23° C., having the formula (1):

$$R^2R^1{}_2SiO(R^1{}_2SiO)_m SiR^1{}_2R^2 \qquad (1)$$

wherein R¹ is each independently an unsubstituted or substituted monovalent hydrocarbon group free of an addition-reactive carbon-carbon unsaturated bond, R² is an alkenyl group, and m is an integer of 1 to 10,000, and (ii) an organopolysiloxane having the average formula (2):

$$(R^1{}_3SiO_{1/2})_p(R^2{}_a R^1{}_{3-a}SiO_{1/2})_q(SiO_{4/2})_r \qquad (2)$$

wherein R¹ is each independently an unsubstituted or substituted monovalent hydrocarbon group free of an addition-reactive carbon-carbon unsaturated bond, R² is an alkenyl group, p, q and r are numbers in the range: p>0, q>0, r>0, and p+q+r=1, a is 1 or 2,
   (B) an organohydrogenpolysiloxane having the average formula (3):

$$(H_b R^1{}_{3-b}SiO_{1/2})_s(R^1{}_3SiO_{1/2})_{2-s}(HR^1{}_1 SiO_{2/2})_t (R^1{}_2SiO_{2/2})_u \qquad (3)$$

wherein R¹ is each independently an unsubstituted or substituted monovalent hydrocarbon group free of an addition-reactive carbon-carbon unsaturated bond, b is 1 or 2, s, t and u are numbers in the range: 0≤s≤2, 2≤s+t, 2≤t+u≤800, and 0.05≤t/(t+u)≤0.5,
   (C) a hydrosilylation reaction catalyst, and
   (D) 0.05 to 5 parts by weight per 100 parts by weight of components (A) and (B) combined of at least one of a linear organosiloxane compound having the average formula (4) and a cyclic organopolysiloxane having the average formula (5):

$$(A_c R^3{}_{3-c}SiO_{1/2})_v(R^3{}_3SiO_{1/2})_{2-v}(AR^3{}_1SiO_{2/2})_w (R^3{}_2SiO_{2/2})_x \qquad (4)$$

$$(AR^3{}_1SiO_{2/2})_y(R^3{}_2SiO_{2/2})_z \qquad (5)$$

wherein A is each independently an alicyclic epoxy group represented by the structural formula (6):

[Chem. 1]

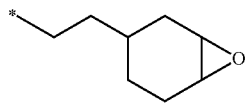

(6)

wherein the asterisk (*) designates a point of attachment to a silicon atom, R³ is each independently an unsubstituted or substituted monovalent hydrocarbon group, c is 1 or 2, v is 0, 1 or 2, w and x are numbers in the range: 0≤w+x≤100, with the proviso that v and w are not equal to 0 at the same time, y and z are numbers in the range: y≥1, z≥0, and 3≤y+z≤5,
   wherein a ratio of the total number of Si—H groups including Si—H groups in component (B) to the total number of alkenyl groups in component (A) and addition-reactive carbon-carbon unsaturated bonds in component (D) is from 0.8 to 1.5.

2. The adhesive composition of 1, further comprising (E) 0.05 to 10 parts by weight per 100 parts by weight of components (A) and (B) combined of an adhesive aid exclusive of component (D) wherein a ratio of the total number of Si—H groups in components (B) and (E) to the total number of alkenyl groups in component (A) and addition-reactive carbon-carbon unsaturated bonds in components (D) and (E) is from 0.8 to 1.5.
3. The adhesive composition of 1 or 2 which is an addition-curable silicone adhesive composition of two part type consisting of a first part containing components (A) and (C), but not component (B) and a second part containing components (A) and (B), but not component (C).
4. An article comprising an adhesive layer composed of the addition-curable silicone adhesive composition of any one of 1 to 3 in the cured state.

Advantageous Effects Of Invention

The addition-curable silicone adhesive composition eliminates a need for a heating furnace and an exhaust system associated therewith because the adhesive composition cures and bonds to substrates even at normal temperature. The composition also has resistance to a drop with time of adhesion of the cured product in a hot humid environment.

By virtue of these properties, the addition-curable silicone adhesive composition can be used not only as versatile adhesive in a wide variety of fields including vehicle mount and electric/electronic applications, but also as sealants, gaskets, coating materials, and potting materials.

DESCRIPTION OF EMBODIMENTS

Now the invention is described in detail.
[1] Component (A)
The addition-curable silicone adhesive composition of the invention contains as component (A) at least one of (i) a linear organopolysiloxane with a viscosity of 50 to 10,000,000 mPa·s at 23° C., having the following formula (1) and (ii) an organopolysiloxane having the following average formula (2).

  (1)

  (2)

Herein, $R^1$ is each independently an unsubstituted or substituted monovalent hydrocarbon group free of an addition-reactive carbon-carbon unsaturated bond, and $R^2$ is an alkenyl group.

The monovalent hydrocarbon group $R^1$ is not particularly limited as long as it is free of an addition-reactive carbon-carbon unsaturated bond. The monovalent hydrocarbon group may be straight, branched or cyclic, and preferably has 1 to 20 carbon atoms, more preferably 1 to 10 carbon atoms, even more preferably 1 to 5 carbon atoms.

Examples thereof include straight or branched alkyl groups such as methyl, ethyl, n-propyl, isopropyl, n-butyl, tert-butyl, and n-hexyl; cyclic alkyl groups such as cyclohexyl; aryl groups such as phenyl and tolyl; and aralkyl groups such as benzyl and phenylethyl.

In the monovalent hydrocarbon groups, some or all of the hydrogen atoms may be substituted by halogen atoms such as F, Cl or Br, cyano or the like. Suitable substituted groups include halogen-substituted hydrocarbon groups such as 3,3,3-trifluoropropyl and cyano-substituted hydrocarbon groups such as 2-cyanoethyl.

Among others, $R^1$ in either of formulae (1) and (2) is preferably methyl in view of heat resistance.

The alkenyl group $R^2$, which is not particularly limited, may be straight, branched or cyclic, and preferably has 2 to 20 carbon atoms, more preferably 2 to 10 carbon atoms, even more preferably 2 to 6 carbon atoms.

Examples thereof include vinyl, allyl, butenyl, pentenyl, and hexenyl, with vinyl being preferred.

In formula (1), m is an integer of 1 to 10,000, preferably 100 to 1,000. If m is 0, the compound is likely to volatilize in an atmospheric pressure environment or in a reduced pressure environment during deaeration. If m exceeds 10,000, component (i) has a high viscosity and is awkward to work and difficult to uniformly mix with other components.

In formula (2), p, q and r are numbers in the range: p>0, q>0, r>0, and p+q+r=1, and "a" is 1 or 2.

Component (i) has a viscosity at 23° C. of 50 to 10,000,000 mPa·s, preferably 1,000 to 100,000 mPa·s. If the viscosity is less than 50 mPa·s, the compound is likely to volatilize in an atmospheric pressure environment or in a reduced pressure environment during deaeration. If the viscosity exceeds 10,000,000 mPa·s, the compound with such a high viscosity is awkward to work and difficult to uniformly mix with other components. Notably, the viscosity is measured by a rotational viscometer.

Also, component (i) preferably has a weight average molecular weight (Mw) of 500 to 500,000, more preferably 1,000 to 100,000, as measured by gel permeation chromatography (GPC) versus polystyrene standards using THF solvent.

Component (i) is preferably an organopolysiloxane having the formula (1-1).

  (1-1)

Herein Me stands for methyl and Vi for vinyl (the same holds true, hereinafter), and m is as defined above.

Examples of component (i) include organopolysiloxanes of the following formulae, but are not limited thereto.

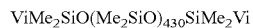

Notably, component (i) may be used alone or in admixture of two or more.

Also, a ratio of M units to Q units in component (ii), (p+q)/r, is preferably from 0.3 to 2.0, more preferably from 0.5 to 1.0.

Component (ii) preferably has a Mw of 1,000 to 50,000, more preferably 2,000 to 10,000.

Component (ii) is preferably an organopolysiloxane having the following average formula:

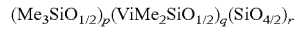

wherein p, q and r are as defined above.

An organopolysiloxane of the following average formula is exemplary of component (ii) although examples are not limited thereto.

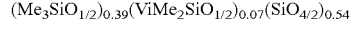

Herein Me and Vi are as defined above.

Notably, component (ii) may be used alone or in admixture of two or more.

When a mixture of components (i) and (ii) is used as component (A), the mixing ratio (weight ratio) of component (i) to component (ii) is preferably from 0.3 to 10, more preferably from 0.5 to 3, though not limited thereto.

Also, the mixture of components (i) and (ii) preferably has a viscosity at 23° C. of 1 to 100,000 mPa·s, more preferably 5 to 10,000 mPa·s. A viscosity in the range ensures high fluidity and ease of handling.

Notably, since component (ii) is sometimes solid at 23° C., it may be dissolved in component (i) prior to use.

[2] Component (B)

The addition-curable silicone adhesive composition contains as component (B) an organohydrogenpolysiloxane having the average formula (3).

$$(H_bR^1{}_{3-b}SiO_{1/2})_s(R^1{}_3SiO_{1/2})_{2-s}(HR^1{}_1SiO_{2/2})_t (R^1{}_2SiO_{2/2})_u \tag{3}$$

In formula (3), R' is a monovalent hydrocarbon group, examples of which are as exemplified above for component (A), with methyl being preferred.

The subscript b is 1 or 2, preferably 1;
s is a number in the range: $0 \leq s \leq 2$, preferably 2;
s+t is at least 2, preferably at least 3;
t and u are numbers in the range $2 \leq t+u \leq 800$, preferably $2 \leq t+u \leq 300$; $t/(t+u)$ is a number in the range: $0.05 \leq t/(t+u) \leq 0.5$, preferably $0.15 \leq t/(t+u) \leq 0.3$.

If t+u in formula (3) is less than 2, three-dimensional crosslinks cannot be formed or the silicone cured product is very soft or has a low strength, failing to obtain satisfactory rubber physical properties. If t+u exceeds 800, component (B) has a high viscosity and is difficult to uniformly mix with other components. If t/(t+u) is less than 0.05, the silicone cured product is very soft or has a low strength, failing to obtain satisfactory rubber physical properties. A value of t/(t+u) in excess of 0.5 leads to a likelihood of bubbling during cure.

Component (B) has a kinematic viscosity at 25° C. which is preferably 0.5 to 20,000 mm²/s, more preferably 1 to 500 mm²/s, but not limited thereto. As used herein, the kinematic viscosity is measured by a Cannon-Fenske viscometer.

Component (B) preferably has a Mw of 600 to 60,000, more preferably 1,000 to 10,000.

Examples of component (B) include organohydrogenpolysiloxanes having the following average formulae, but are not limited thereto.

Component (B) may be used alone or in admixture.

[Chem. 2]

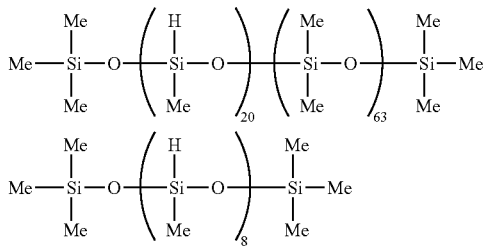

In the left formula, the order of arrangement of siloxane units is arbitrary.

Component (B) is preferably blended in an amount of 1 to 200 parts by weight, more preferably 2 to 50 parts by weight per 100 parts by weight of component (A). An amount in the range ensures that a cured product of the silicone adhesive composition has a satisfactory hardness and strength.

A ratio of the total number of Si—H groups including Si—H groups in component (B) (the number of Si—H groups in component (B), or when component (E) to be described later is contained, the total number of Si-H groups in component (B) and Si—H groups in component (E)) to the number of alkenyl groups in component (A) and component (D) to be described later, that is, (Si—H groups)/(alkenyl groups and addition reactive carbon-carbon unsaturated bonds), is from 0.8 to 1.5, preferably from 1 to 1.3. A ratio in the range ensures effective cure and suppresses bubbling during cure.

[3] Component (C)

The addition-curable silicone adhesive composition contains as component (C) a hydrosilylation reaction catalyst for promoting addition reaction of alkenyl groups in component (A) and addition reactive carbon-carbon unsaturated bonds in component (D) to be described later with Si—H groups in component (B) and component (E) to be described later.

Examples of the catalyst include platinum group metals alone such as platinum (including platinum black), rhodium and palladium; platinum chlorides, chloroplatinic acids and chloroplatinates such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$, wherein n is an integer of 0 to 6, preferably 0 or 6; alcohol-modified chloroplatinic acids (see U.S. Pat. No. 3,220,972); chloroplatinic acid-olefin complexes (see U.S. Pat. No. 3,159,601, U.S. Pat. No. 3,159,662 and U.S. Pat. No. 3,775,452); supported catalysts comprising platinum group metals such as platinum black and palladium on supports of aluminum oxide, silica and carbon; rhodium-olefin complexes; chlorotris(triphenylphosphine)rhodium (known as Wilkinson's catalyst); and complexes of platinum chlorides, chloroplatinic acids and chloroplatinates with vinyl-containing siloxanes.

Component (C) may be used alone or in admixture.

The amount of component (C) used is not particularly limited as long as the amount is sufficient to promote the cure or hydrosilylation reaction of the composition, specifically an amount to give preferably 0.01 to 500 ppm, more preferably 0.05 to 100 ppm, even more preferably 0.01 to 50 ppm by weight of metal atoms available from component (C) based on the total weight of components in the composition.

[4] Component (D)

The addition-curable silicone adhesive composition contains as component (D) at least one of a linear organosiloxane compound having the average formula (4) and a cyclic organopolysiloxane having the average formula (5). It is an adhesive aid for imparting resistance to adhesion lowering in a hot humid environment to the addition-curable silicone adhesive composition.

$$(A_cR^3{}_{3-c}SiO_{1/2})_v(R^3{}_3SiO_{1/2})_{2-v}(AR^3{}_1SiO_{2/2})_w (R^3{}_2SiO_{2/2})_x \tag{4}$$

$$(AR^3{}_1SiO_{2/2})_y(R^3{}_2SiO_{2/2})_z \tag{5}$$

In formulae (4) and (5), A is each independently an alicyclic epoxy group represented by the structural formula (6):

[Chem. 3]

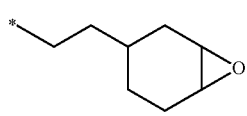

wherein the asterisk (*) designates a point of attachment to a silicon atom.

R³ is each independently an unsubstituted or substituted monovalent hydrocarbon group.

The monovalent hydrocarbon group $R^3$ may be straight, branched or cyclic and is preferably of 1 to 20 carbon atoms, more preferably 1 to 10 carbon atoms, even more preferably 1 to 5 carbon atoms.

Examples thereof include straight or branched alkyl groups such as methyl, ethyl, n-propyl, isopropyl, n-butyl, tert-butyl, and n-hexyl; cyclic alkyl groups such as cyclohexyl; alkenyl groups such as vinyl, allyl, 3-butenyl, 4-pentenyl and 5-hexenyl; aryl groups such as phenyl and tolyl; and aralkyl groups such as benzyl and phenylethyl.

In these monovalent hydrocarbon groups, some or all of the hydrogen atoms may be substituted by halogen atoms such as F, Cl or Br, cyano or the like. Examples of such substituted group include halogen-substituted hydrocarbon groups such as 3,3,3-trifluoropropyl and cyano-substituted hydrocarbon groups such as 2-cyanoethyl.

Of these, $R^3$ is preferably methyl in view of heat resistance.

In formula (4), c is 1 or 2, v is 0, 1 or 2, w and x are numbers in the range: $0 \leq w+x \leq 100$, with the proviso that v and w are not equal to 0 at the same time.

In formula (5), y and z are numbers in the range: $y \geq 1$, $z \geq 0$, and $3 \leq y+z \leq 5$, preferably $y \geq 2$.

Examples of component (D) include alicyclic epoxy group-containing polysiloxanes having the following structural formulae, but are not limited thereto.

Component (D) may be used alone or in admixture.

[Chem. 4]

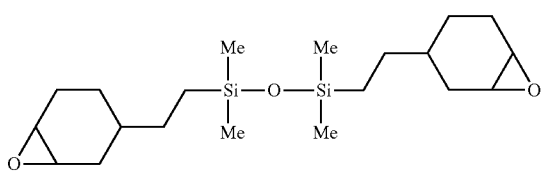

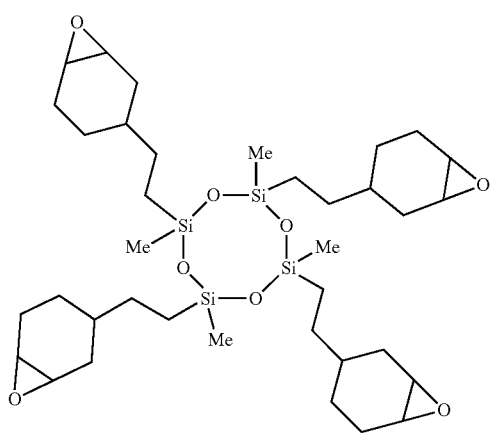

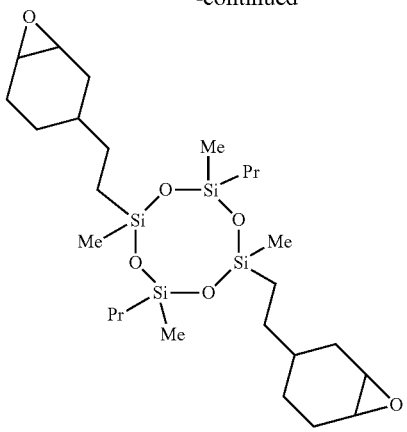

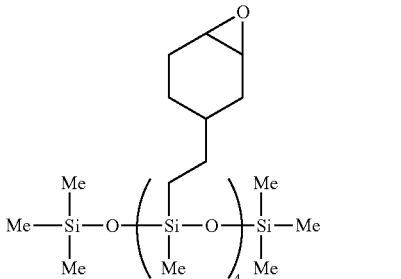

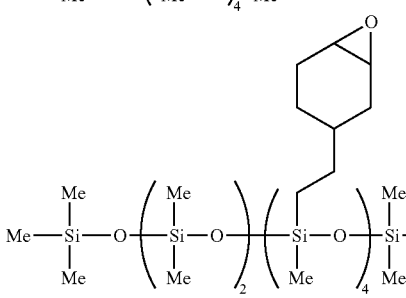

Herein Pr stands for n-propyl (the same holds true, hereinafter). The arrangement of siloxane units is arbitrary.

In the practice of the invention, commercial products may be used as the alicyclic epoxy group-containing polysiloxane. Exemplary commercial products include X-22-169, X-40-2670, and X-40-2678 (all available from Shin-Etsu Chemical Co., Ltd.). Component (D) is added in an amount of 0.05 to 5 parts by weight per 100 parts by weight of components (A) and (B) combined. An addition amount of less than 0.05 part by weight may lead to insufficient adhesion in a hot humid environment whereas an amount in excess of 5 parts by weight may result in a soft, low strength silicone cured product, failing to obtain satisfactory rubber physical properties.

[5] Component (E)

To the addition-curable silicone adhesive composition, an adhesive aid other than component (D) may be added as component (E).

Component (E) encompasses siloxane bond-containing adhesive aids, examples of which include vinyltriethoxysilane (KBE-1003 by Shin-Etsu Chemical Co., Ltd.), γ-(glycidyloxypropyl)trimethoxysilane (KBM-403 by Shin-Etsu Chemical Co., Ltd.), γ-(methacryloxypropyl)trimethoxysilane (KBM-503 by Shin-Etsu Chemical Co., Ltd.), 7-octenyltrimethoxysilane (KBM-1083 by Shin-Etsu Chemical Co., Ltd.), and hydrolyzates thereof, as well as compounds having the following structural formulae.

Notably, component (E) may be used alone or in admixture.

[Chem. 5]

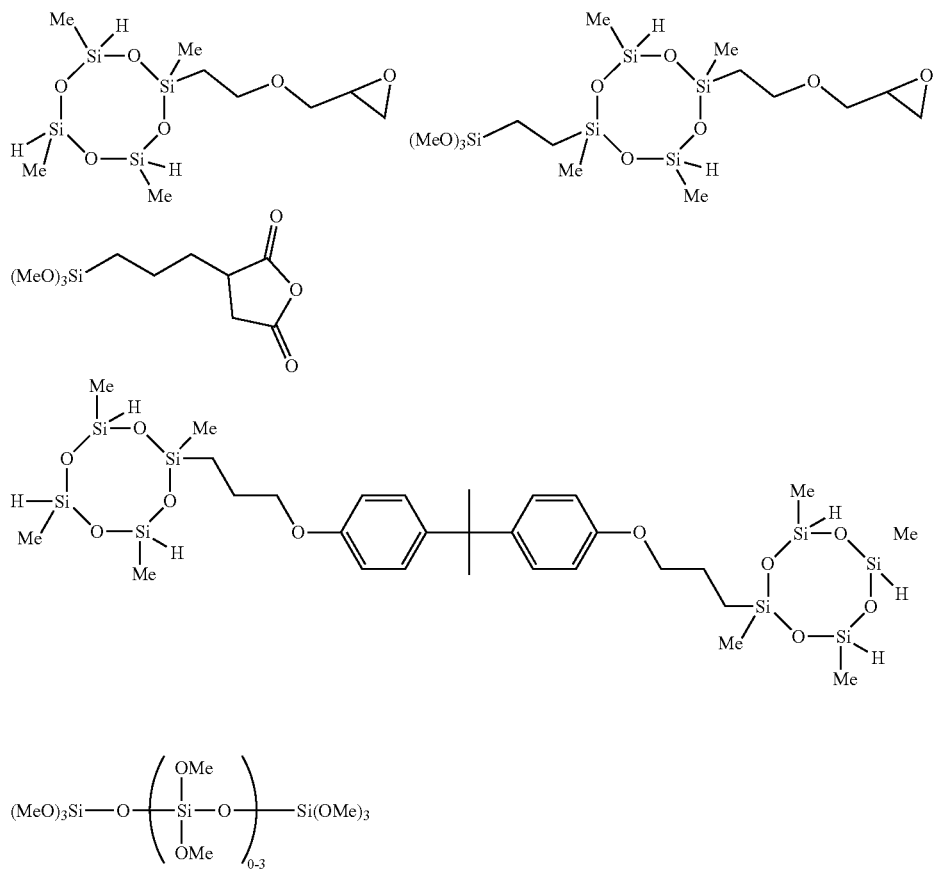

Exemplary siloxane bond-free adhesive aids include allyl glycidyl ether, vinyl cyclohexene monoxide, diethyl 2-allylmalonate, diallyl bisphenol ether, allyl benzoate, diallyl phthalate, tetraallyl pyromellitate (TRIAM-805 by Fuji Film Wako Pure Chemical Co., Ltd.), and triallyl isocyanurate.

When used, the amount of component (E) added is preferably 0.05 to 10 parts by weight, more preferably 0.05 to 5 parts by weight per 100 parts by weight of components (A) and (B) combined. As long as the amount of component (E) added is in the range, appropriate adhesion is achievable.

[6] Component (F)

To the addition-curable silicone adhesive composition, (F) a reaction inhibitor may be added, if necessary, for the purpose of controlling the reactivity of the hydrosilylation reaction catalyst so as to prevent the composition from viscosity buildup or gelation when the composition is prepared or prior to heat curing, specifically upon coating of the composition to a substrate.

Examples of the reaction inhibitor include 3-methyl-1-butyn-3-ol, 3-methyl-1-pentyn-3-ol, 3,5-dimethyl-1-hexyn-3-ol, 1-ethynylcyclohexanol, ethynyl methyl decyl carbinol, 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, and 1,1,3,3-tetramethyl-1,3-divinyldisiloxane, which may be used alone or in admixture.

Of these, 1-ethynylcyclohexanol, ethynyl methyl decyl carbinol, and 3-methyl-1-butyn-3-ol are preferred.

When used, the amount of component (F) added is preferably 0.01 to 2.0 parts by weight, more preferably 0.01 to 0.1 part by weight per 100 parts by weight of components (A) and (B) combined. An amount in the range allows component (F) to exert a reaction controlling effect to a full extent.

[7] Other Components

In addition to the foregoing components (A) to (F), the addition-curable silicone adhesive composition may contain other components to be illustrated below as long as the objects of the invention are not compromised.

Other components include, for example, thixotropic agents such as fumed silica; reinforcing agents such as fumed silica and crystalline silica; heat resistance improvers such as metal oxides and metal hydroxides; photo-stabilizers; heat resistance improvers such as metal oxides and metal hydroxides; heat conductive fillers such as alumina and crystalline silica; and viscosity regulators such as non-reactive silicone oil free of a reactive functional group.

The addition-curable silicone adhesive composition may be prepared by mixing the foregoing components (A) to (D), optional components (E) and (F), and other components in a well-known manner.

One preferred embodiment is a composition of two part type. In this embodiment, a first part containing components (A) and (C), and other components, if necessary, and a second part containing components (A) and (B), and other components, if necessary, are separately prepared, and the first and second parts are mixed prior to use. Some components may be common to the first and second parts. The composition of two part type ensures shelf stability.

The mixing ratio of the first and second parts on use is determined in accordance with the formulation design of the components. Any suitable mixing ratio is set such that a silicone adhesive composition within the scope of the invention may be obtained after mixing. From the standpoint of ease of mixing, the mixing ratio (volume ratio) of the first part to the second part is preferably set to (first part):(second part)=10:1 to 1:10, more preferably (first part):(second part)= 2:1 to 1:2.

The procedure of mixing the first and second parts may be either by metering the separate fluids and mixing them on a mixer or the like, or by using a dispenser equipped at its distal end with a static mixer, mechanically feeding the first and second parts from their packages, and mixing them within the mixer.

Suitable packaging containers include resin twin-cartridge system by MIX-PAC, resin cartridge by Shirouma Science Co., Ltd., and resin syringe by Musashi Engineering Inc. Suitable dispensers include PC pump dispenser by Heishin Ltd., two fluid mixing type dispenser by Musashi Engineering Inc., and two component mixing type dispenser by Naka Liquid Control Co., Ltd.

The addition-curable silicone adhesive composition does not need a heating furnace and an exhaust system associated therewith because it cures and bonds to a substrate even at normal temperature (5 to 35° C.).

It is noted that the cure of the composition can be promoted by heating. Such heating means is effective where it is desired to increase mass productivity. A sufficient effect is achievable using a compact heater for local heating.

EXAMPLES

Examples and Comparative Examples are given below for further illustrating the invention, but the invention is not limited thereto.

In Examples, the viscosity is measured at 23° C. by a rotational viscometer; the kinematic viscosity is measured at 23° C. by a Cannon-Fenske viscometer; and the Mw is measured by GPC versus polystyrene standards using THF solvent.

Examples 1 to 3 and Comparative Examples 1 to 3

A silicone adhesive composition of two part type was prepared by mixing the following components in the blending ratios shown in Table 1. Specifically, the first part was prepared by premixing (A-i-2) and (A-ii), mixing the premix with (A-i-1), (C) and fumed silica, and defoaming. The second part was prepared by mixing (A-i-1), (A-i-2), (B), (D), (E), (F) and fumed silica, and defoaming.

Component (A):
(A-i-1) organopolysiloxane (viscosity 10,000 mPa·s at 23° C.) of the following average formula:

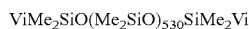
ViMe$_2$SiO(Me$_2$SiO)$_{530}$SiMe$_2$Vi (A-i-2) organopolysiloxane (viscosity 5,000 mPa·s at 23° C.) of the following average formula:

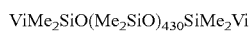
ViMe$_2$SiO(Me$_2$SiO)$_{430}$SiMe$_2$Vi (A-ii) organopolysiloxane (Mw 4,500) of the following average formula:

(Me$_3$SiO$_{1/2}$)$_{0.39}$(ViMe$_2$SiO$_{1/2}$)$_{0.07}$(SiO$_{4/2}$)$_{0.54}$ Component (B):
(B-1) dimethylsiloxane/methylhydrogensiloxane copolymer capped with trimethylsiloxy at both ends of the molecular chain (kinematic viscosity 99.0 mm$^2$/s at 23° C., silicon-bonded hydrogen content 0.0037 mol/g) of the following average formula:

[Chem. 6]

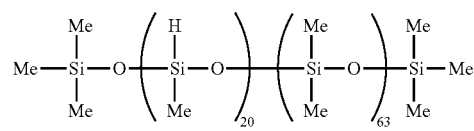

Herein the arrangement of siloxane units is random or blockwise.

Component (C):
(C-1) dimethylsiloxane solution of platinum 1,3-divinyl-1,1,3,3-tetramethyldisiloxane complex (Pt content 1.0 wt %)

Component (D):
(D-1) compound of the following structural formula:

[Chem. 7]

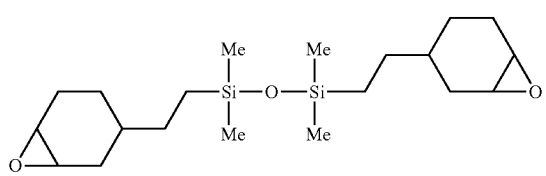

(D-2) compound of the following structural formula (X-40-2670 by Shin-Etsu Chemical Co., Ltd.)

[Chem. 8]

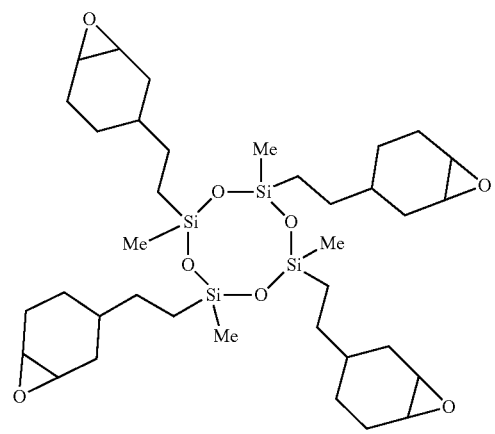

(D-3) compound of the following structural formula:

[Chem. 9]

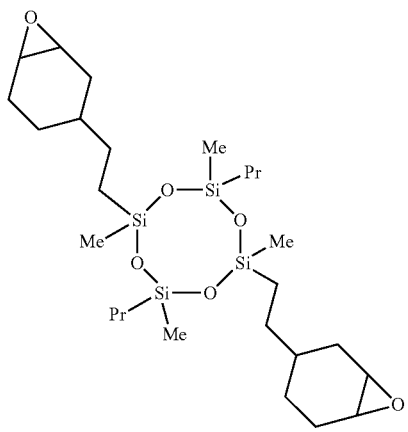

(D-4) compound of the following structural formula (comparative component)

[Chem. 10]

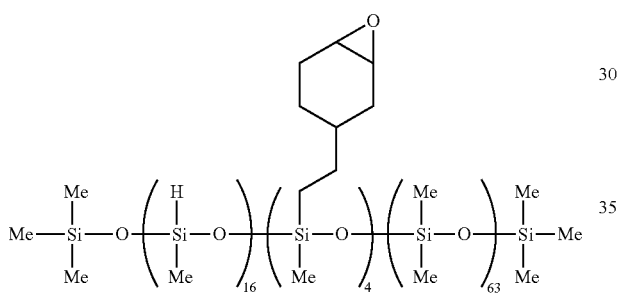

Herein the arrangement of siloxane units is random or blockwise.

(D-5) compound of the following structural formula (Celloxide 2021P by Daicel Corp., comparative component)

[Chem. 11]

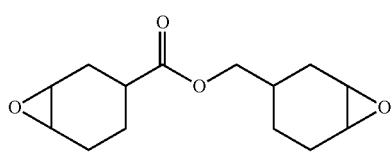

(D-6) 4-hydroxybutyl acrylate glycidyl ether (4HBAGE by Mitsubishi Chemical Corp., comparative component)

[Chem. 12]

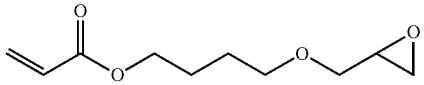

Component (E): Adhesive Aid (E-1) compound of the following structural formula:

[Chem. 13]

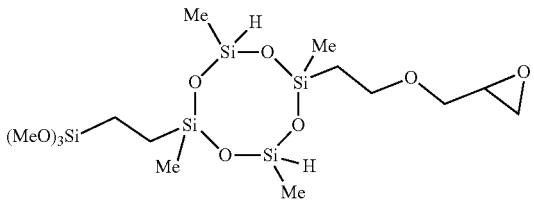

(E-2) compound of the following structural formula:

[Chem/ 14]

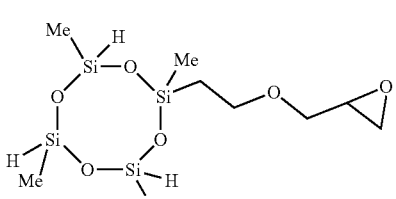

(E-3) 7-octenyltrimethoxysilane (KBM-1083 by Shin-Etsu Chemical Co., Ltd.)

Component (F): Reaction Inhibitor (F-1) ethynyl methyl decyl carbinol

Other Component:
fumed silica (Aerosil NSX-200 by Nippon Aerosil Co., Ltd., specific surface area 140 m$^2$/g, average primary particle size 8 nm)

TABLE 1

|  |  |  | Example 1 | | Example 2 | | Example 3 | | Comparative Example 1 | | Comparative Example 2 | | Comparative Example 3 | |
|---|---|---|---|---|---|---|---|---|---|---|---|---|---|---|
|  |  |  | 1st part | 2nd part | 1st part | 2nd part | 1st part | 2nd part | 1st part | 2nd part | 1st part | 2nd part | 1st part | 2nd part |
| Blending ratio (pbw) | (A) | (A-i-1) | 40 | 40 | 40 | 40 | 40 | 40 | 40 | 40 | 40 | 40 | 40 | 40 |
|  |  | (A-i-2) | 5.0 | 5.0 | 5.0 | 5.0 | 5.0 | 5.0 | 5.0 | 5.0 | 5.0 | 5.0 | 5.0 | 5.0 |
|  |  | (A-ii) | 2.5 | 2.5 | 2.5 | 2.5 | 2.5 | 2.5 | 2.5 | 2.5 | 2.5 | 2.5 | 2.5 | 2.5 |
|  | (B) | (B-1) | — | 3.0 | — | 3.0 | — | 3.0 | — | 3.0 | — | 3.0 | — | 3.0 |
|  | (C) | (C-1) | 0.5 | — | 0.5 | — | 0.5 | — | 0.5 | — | 0.5 | — | 0.5 | — |
|  | (D) | (D-1) | — | 1.0 | — | — | — | — | — | — | — | — | — | — |

TABLE 1-continued

|  |  | Example 1 | | Example 2 | | Example 3 | | Comparative Example 1 | | Comparative Example 2 | | Comparative Example 3 | |
| --- | --- | --- | --- | --- | --- | --- | --- | --- | --- | --- | --- | --- | --- |
|  |  | 1st part | 2nd part | 1st part | 2nd part | 1st part | 2nd part | 1st part | 2nd part | 1st part | 2nd part | 1st part | 2nd part |
|  | (D-2) | — | — | — | 1.0 | — | — | — | — | — | — | — | — |
|  | (D-3) | — | — | — | — | — | 1.0 | — | — | — | — | — | — |
|  | (D-4) | — | — | — | — | — | — | — | 1.0 | — | — | — | — |
|  | (D-5) | — | — | — | — | — | — | — | — | — | 1.0 | — | — |
|  | (D-6) | — | — | — | — | — | — | — | — | — | — | — | 1.0 |
| (E) | (E-1) | — | 1.0 | — | 1.0 | — | 1.0 | — | 1.0 | — | 1.0 | — | 1.0 |
|  | (E-2) | — | 0.5 | — | 0.5 | — | 0.5 | — | 0.5 | — | 0.5 | — | 0.5 |
|  | (E-3) | — | 1.5 | — | 1.5 | — | 1.5 | — | 1.5 | — | 1.5 | — | 1.5 |
| (F) | (F-1) | — | 0.06 | — | 0.06 | — | 0.06 | — | 0.06 | — | 0.6 | — | 0.06 |
| Other | silica | 9.2 | 9.2 | 9.2 | 9.2 | 9.2 | 9.2 | 9.2 | 9.2 | 9.2 | 9.2 | 9.2 | 9.2 |
| SiH/alkenyl |  | 1.4 | | 1.4 | | 1.4 | | 1.6 | | 1.4 | | 1.1 | |

The addition-curable silicone adhesive compositions prepared in Examples and Comparative Examples were evaluated for adhesion by the following method. The results are shown in Table 2.

[Method of Mixing and Discharging Addition-Curable Silicone Adhesive Composition]

A twin resin cartridge (MIX-PAC) was filled with the addition-curable silicone adhesive composition and equipped at its distal end with a static nozzle (21 stages). Using a cartridge gun, the first and second parts were discharged while mixing in a volume ratio of 1:1.

[Adhesion Test]

The adherends used herein were a polybutylene terephthalate (PBT) plate and an aluminum (Al) plate. Each of the addition-curable silicone adhesive compositions prepared in Examples and Comparative Examples was evaluated for adhesion to each plate. The addition-curable silicone adhesive composition was mixed and coated onto the adherend by the above mixing and discharging method, and cured by allowing it to stand in an environment of 21-25° C. and 50% RH for 24 hours. The cured product was cut with a razor blade, manually pulled in a direction of 90° in an environment of 21-25° C., and evaluated (peeled or bonded).

Furthermore, after the cured product bonded to the adherend was exposed to an environment of 85° C. and 85% RH for 500 hours and 1,000 hours, it was taken out, allowed to stand in an environment of 21-25° C. and 50% RH for 1 day, and examined by the above adhesion test. The results are also shown in Table 2.

TABLE 2

|  |  | Example 1 | Example 2 | Example 3 | Comparative Example 1 | Comparative Example 2 | Comparative Example 3 |
| --- | --- | --- | --- | --- | --- | --- | --- |
| Adhesion test | Just as cured (Al/PBT) | bonded/bonded | bonded/bonded | bonded/bonded | bonded/bonded | peeled/bonded | bonded/bonded |
|  | After 85° C./85% RH/ 500 h exposure (Al/PBT) | bonded/bonded | bonded/bonded | bonded/bonded | bonded/peeled | peeled/peeled | bonded/peeled |
|  | After 85° C./85% RH/ 1,000 h exposure (Al/PBT) | bonded/bonded | bonded/bonded | bonded/bonded | bonded/peeled | peeled/peeled | peeled/peeled |

As seen from Table 2, the cured products of the addition-curable silicone adhesive compositions prepared in Examples 1 to 3 maintain tight adhesion to the substrates under hot humid conditions over a long period of time.

In contrast, the component (D)-free compositions in Comparative Examples 1 to 3 are inferior in durability under hot humid conditions.

The invention claimed is:

1. An addition-curable silicone adhesive composition comprising:
   (A) at least one of (i) a linear organopolysiloxane with a viscosity of 50 to 10,000,000 mPas at 23° C., having the formula (1):

  (1)

wherein $R^1$ is each independently an unsubstituted or substituted monovalent hydrocarbon group free of an addition-reactive carbon-carbon unsaturated bond, $R^2$ is an alkenyl group, and m is an integer of 1 to 10,000, and (ii) an organopolysiloxane having the average formula (2):

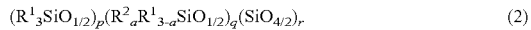  (2)

wherein $R^1$ is each independently an unsubstituted or substituted monovalent hydrocarbon group free of an addition-reactive carbon-carbon unsaturated bond, $R^2$ is an alkenyl group, p, q and r are numbers in the range: p>0, q>0, r>0, and p+q+r=1, a is 1 or 2,
   (B) an organohydrogenpolysiloxane having the average formula (3):

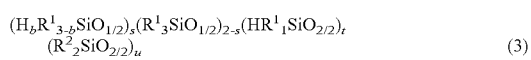  (3)

wherein $R^1$ is each independently an unsubstituted or substituted monovalent hydrocarbon group free of an addition-reactive carbon-carbon unsaturated bond, b is 1 or 2, s, t and u are numbers in the range: 0≤s ≤2, 2≤s+t, 2≤t+u≤800, and 0.05≤t/(t+u)≤0.5,
   (C) a hydrosilylation reaction catalyst, and
   (D) 0.05 to 5 parts by weight per 100 parts by weight of components (A) and (B) combined of at least one of a linear organosiloxane compound having the average formula (4) and a cyclic organopolysiloxane having the average formula (5):

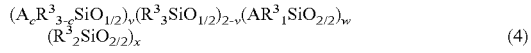  (4)

wherein A is each independently an alicyclic epoxy group represented by the structural formula (6):

[Chem. 1]

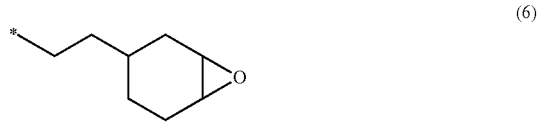  (6)

wherein the asterisk (*) designates a point of attachment to a silicon atom, $R_3$ is each independently an unsubstituted or substituted monovalent hydrocarbon group, c is 1 or 2, v is 0, 1 or 2, w and x are numbers in the range: 0≤w+x≤100, with the proviso that v and w are not equal to 0 at the same time, y and z are numbers in the range: y≥1, z≥0, and 3≤y+z ≤5, wherein a ratio of the total number of Si-H groups including Si-H groups in component (B) to the total number of alkenyl groups in component (A) and addition-reactive carbon-carbon unsaturated bonds in component (D) is from 0.8 to 1.5.

2. The adhesive composition of claim 1, further comprising (E) 0.05 to 10 parts by weight per 100 parts by weight of components (A) and (B) combined of an adhesive aid exclusive of component (D) wherein a ratio of the total number of Si-H groups in components (B) and (E) to the total number of alkenyl groups in component (A) and addition-reactive carbon- carbon unsaturated bonds in components (D) and (E) is from 0.8 to 1.5.

3. The adhesive composition of claim 1 which is an addition- curable silicone adhesive composition of two part type consisting of a first part containing components (A) and (C), but not component (B) and a second part containing components (A) and (B), but not component (C).

4. An article comprising an adhesive layer composed of the addition-curable silicone adhesive composition of claim 1 in the cured state.

5. The adhesive composition of claim 1, wherein component (D) consists of a linear organosiloxane compound having the average formula (4).

* * * * *